Jan. 25, 1966 D. C. FORSTER ET AL 3,231,825

D.C. PUMPED CYCLOTRON WAVE PARAMETRIC AMPLIFIER

Filed Nov. 14, 1960 2 Sheets-Sheet 1

INVENTORS
DONALD C. FORSTER,
CURTIS C. JOHNSON,
LOUIS D. SMULLIN,

By Daniel T. Anderson

ATTORNEY.

D.C. PUMPED CYCLOTRON WAVE PARAMETRIC AMPLIFIER

Filed Nov. 14, 1960

INVENTORS.
DONALD C. FORSTER,
CURTIS C. JOHNSON,
LOUIS D. SMULLIN,
BY
Daniel T. Anderson
ATTORNEY.

United States Patent Office 3,231,825

Patented Jan. 25, 1966

3,231,825

D.C. PUMPED CYCLOTRON WAVE PARAMETRIC AMPLIFIER

Donald C. Forster, Torrance, and Curtis C. Johnson, Canoga Park, Calif., and Louis D. Smullin, Watertown, Mass., assignors to Hughes Aircraft Company, Culver City, Calif., a corporation of Delaware Filed Nov. 14, 1960, Ser. No. 69,223
5 Claims. (Cl. 330—4.7)

This invention relates to beam-type parametric amplifiers, and more particularly to cyclotron wave devices utilizing a new mechanism for parametric, or parametric-like, amplification.

This application is a continuation-in-part of applicants' copending application, Serial No. 12,326, filed March 2, 1960, and now abandoned.

In the field of beam-type amplifiers work has progressed recently in the development of what has been designated beam-type parametric, or pseudo-parametric, amplifiers, hereinafter referred to as beam-type parametric amplifiers, wherein a traveling wave associated with a stream of charged particles, usually electrons, is "parametrically" pumped, either by an external energy source or by interaction with other waves in the stream.

In non-beam parametric amplifiers, amplification is achieved generally by the mechanism of pumping, that is, varying a particular energy storage parameter of the circuit; hence, the derivation of the title "parametric" amplifier. Such a circuit parameter is usually the magnitude of reactance or energy storageability of a circuit element, such as a capacitor. In such a case, the effective capacitance of the capacitor is varied at approximately twice the frequency of the signal to be amplified. The result can be an exchange of energy from the capacity varying energy source, that is, the pump means, to the signal on the circuit.

In a beam-type parametric amplifier the signal to be amplified is carried on moving waves associated with a particular pattern of motion of the charged particles in the stream. Examples of such a pattern are space charge bunching and cyclotron orbiting of the charged particles. The degree of bunching or the magnitude of the average radius of the orbiting particles may, at least as an illustrative analogy, be considered a parameter of the system which may be pumped by an appropriate method. The pumping results either in adding energy to the signal carried on the waves associated with the particular charged particle pattern of motion, or in providing an environment in which energy in one wave, e.g., the slow wave, is transferred to another wave, e.g., the fast wave.

It has been shown that in addition to the well known fast and slow space charge waves, the slow one being normally used in traveling-wave tube amplifiers of the type utilizing slow-wave structures, cyclotron waves exist when a beam is in the environment of an axial, or combined axial and transverse steady state magnetic field.

The present invention deals primarily with the case where the magnetic field is a longitudinal one, that is, parallel to the electron stream. In this environment the electron stream may readily support a fast cyclotron wave and a slow cyclotron wave. It is to be noted that the fast waves exhibit positive alternating-current power flow, which means that when a fast wave is excited or amplified, it must gain positive radio-frequency power, that is, positive power must be supplied. By the same token, when a signal on the fast wave is attenuated or otherwise eliminated, positive radio-frequency power is removed from the wave. This is not the case with the slow wave normally dealt with in conventional traveling-wave tubes or magnetrons because the slow wave is a negative alternating-current energy carrier. To amplify the slow wave, negative energy must be supplied.

For a thorough treatment of the theory involved in fast wave amplification see "Theory of Fast Wave Parametric Amplification," by C. C. Johnson, Hughes Aircraft Company Research Laboratories, Technical Memorandum No. 540, February 1959, and its included bibliography.

The object generally of beam-type amplifiers is to amplify a wave which may be modulated by the signal to be amplified. As indicated above, this may not be done by ordinary traveling-wave tube techniques dealing with the slow wave because the slow wave can inherently only lose energy. On the other hand, to amplify the fast wave, it being a positive alternating-current energy carrier, means must be provided either to add energy to the stream or achieve an exchange of energy from the slow to the fast wave. In accordance with the prior art, this is done generally by exciting the fast wave on the stream with an input coupler. Then energy is supplied to the fast wave by means of a parametric pump which is driven by an external source of radio-frequency energy. Subsequent to the actual amplification process, the amplified or pumped signal may be removed or utilized by means of an output coupler which may be similar to the input coupler as discussed below. The device readily exhibits high gain with very low noise and is at the same time unconditionally stable with respect to regenerative or feedback-caused oscillations since the only connection between the input and the output of the system is the beam which flows unilaterally from input to output.

Referring more particularly to a beam-type parametric amplifier which utilizes the fast cyclotron wave, a mechanism of parametric pumping may in a simplified way be described as follows. The longitudinal magnetic field utilized for confining the stream serves as a restoring force to keep the electron flow on the average along the desired path parallel to the magnetic field. When the electrons are given transverse components of velocity, as by a transverse field coupler, they experience an oscillation or perturbation about the unperturbed or average path. The perturbation actually consists of cyclotron orbiting of the electrons about the magnetic field. These tarnsverse components of velocity may then be parametrically pumped by a cyclotron pump to a greater magnitude. By thus increasing the average radius of orbiting of the electrons, the amplitude of the fast cyclotron wave may be increased, thereby amplifying any signals being carried by the fast cyclotron wave.

In the past, parametric cyclotron pumps typically consisted of a set of quadrupole electrodes producing a quadrupole electric field excited by an oscillator operating at approximately twice the signal frequency. Thus, it has been necessary first to produce radio-frequency power of greater frequency and of greater power level than that to be amplified. This is obviously a severe disadvantage and indicates inherent limitations regardinng maximum frequency of operation and maximum power output of the amplifier.

It is therefore an object of the present invention to provide a fast cyclotron wave parametric amplifier which does not suffer these and other disadvantages of the prior art.

It is in particular an object to provide a fast cyclotron wave device which may be operated at higher signal frequencies and at higher power levels than were heretofore practical.

It is a further object to provide a device of this character which does not require any radio-frequency pump power.

It is another object to provide such a device which is highly efficient and which achieves a transfer of energy from the slow cyclotron wave to the fast cyclotron wave and, in some configurationns, utilizes one or more of the synchronous modes for amplification.

It is another object to provide such a device which includes a pump structure that is not frequency sensitive or physically complex or microscopically small.

Briefly, in accordance with the present invention, these and other objects are achieved by providing a beam-type parametric amplifier in which the beam is in the environment of a static longitudinal magnetic field. The beam is therefore able to support a fast cyclotron wave associated with the charged particles of the beam. The amplifier includes parametric pumping means which is direct-current energized and which causes an interaction between the slow and fast cyclotron waves. The coupling means or pump comprises a plurality of spaced electrodes. Some of the electrodes are oppositely polarized with respect to the applied direct-current potential compared to others of the electrodes for progressively increasing the radius of cyclotron orbiting of the charged particles of the stream by virtue of a synchronized spatial relationship between the rotation of the charged particles, the disposition of the electrodes and their potential. These spaced electrodes may, as an example, be in the form of a quadrifilar helix or, as another example, in the form of spaced, transversely disposed conductive plates which may, for example, be annular discs, square-holed discs, or rectangular sheets, alternate ones of which are oppositely polarized and along which the beam is projected.

Throughout this specification, whenever possible, a kinematic description of the charged particles as they traverse the system is used. For example, means are described and discussed for increasing the radius of orbiting of the charged particles in a manner to cause amplification of the fast cyclotron wave. This approach is taken in the cause of a simplified presentation. A second approach is to describe the structure and amplification mechanism in terms of energy interchange between different waves on the stream of charged particles. For example, in the present invention as analyzed rigorously, by increasing the radius of cyclotron orbiting an interchange of energy may be shown to be achieved from the slow cyclotron wave to the fast cyclotron wave thus amplifying the latter in a positive sense while amplifying the former in a negative sense. The stream itself, as regards its total energy, neither gains nor loses any energy; energy is merely transferred within the stream from one radio-frequency carrier to another, viz., from a negative carrier to a positive carrier. In other words, the structure of the invention causes negative radio-frequency energy to be added to the slow cyclotron wave and an equal amount of positive radio-frequency energy to be added to the fast cyclotron wave. In this sense the cyclotron pump here is not a "pump" because it does not pump energy into the system but rather creates a desired predetermined environment in which the cyclotron waves may interact as described above.

The novel features of this invention, as well as the invention itself, both as to its organization and method of operation, will best be understood from the following description, taken in conjunction with the accompanying drawing, in which like reference numerals refer to like parts.

Figure 1:
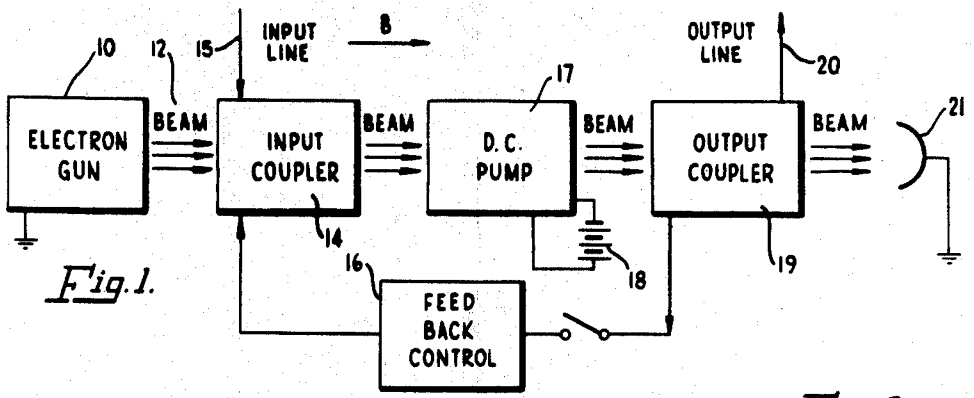
FIGURE 1 is a block diagram of a fast cyclotron wave amplifier in accordance with the present invention.

Referring to FIG. 1, there is shown a schematic representation of the invention in which a charged particle gun 10 projects a beam 12 of charged particles, usually electrons, along an axial path through an input coupler 14 where the stream is modulated by a signal to be amplified. The signal to be amplified may be supplied on an input line 15, or if the system is operating as an oscillator, this signal may be applied from a feedback control circuit 16. The input coupler 14 couples the signal to be amplified to the fast cyclotron wave on the electron stream. The stream 12 thus modulated progresses to the right in the drawing through a direct-current energized cyclotron pump 17 in which interaction between the fast and the slow cyclotron waves causes a transfer of energy from the latter to the former. Thus, the modulation on the fast cyclotron wave is parametrically "pumped." The direct-current energized pump 17 will be discussed in more detail below. The stream 12 then passes on to an output coupler 19 which removes the amplified signal energy from the stream and couples it to an output line 20 or to the feedback control circuit 16 and thence to the input coupler when feedback is desired, as for operation as an oscillator. The output coupler 19 may be similar to the input coupler 14. The stream 12 then progresses to the right to a beam collector 21 where its kinetic energy is dissipated and its charge current returned to a source of potential, not shown.

An axial or longitudinal magnetic field B, indicated by an arrow, is provided in the region of the system described for focusing the stream of charged particles and for providing a cyclotron environment to create a component of motion in the stream consisting of orbiting of the charged particles about the axial direction. The operation of the system depicted in FIG. 1 includes providing the input coupler 14 with a signal to be amplified. The structure and operation of the input coupler 14, as well as the output coupler 19, is described in detail in the literature. The basic mechanism of one example of such a coupler in a different utilization is discussed by C. C. Cuccia, "An Electron Coupler," RCA Review 10, pp. 270–303, June 1949.

The electron stream 12 thus modulated with the modulation consisting of the cyclotron orbiting of the electrons about the direction of the magnetic field B drifts into the pump 17. Within the cyclotron pump 17 amplification of the fast cyclotron wave is achieved by interchanging energy from the slow cyclotron wave to the fast cyclotron wave.

Kinematically, energy is added to the cyclotron orbiting of the electrons at the expense of their axial velocity by providing in the pump an appropriate electric field as described more fully below. The magnitude of the electric field increases substantially linearly with radius outwardly from the center or axis. In the prior art the fast cyclotron wave is generally pumped by a rotating quadrupole field which is achieved by phase feeding a quadrupole structure with radio-frequency pump energy of approximately twice the cyclotron frequency in order to achieve the proper rotation and cyclotron amplification. See "The Quadrupole Amplifier, a Low Noise Parametric Device," by Adler, Hrbek and Wade, Proc. IRE, pp. 1713–1723, October 1959, which is further discussed by Johnson in the above reference Technical Memorandum No. 540. The direct-current energized pump 17 of the present invention does not require radio-frequency excitation and will be discussed in detail below.

The electron stream 12, its orbiting electrons having been pumped to a greater radius of rotation in the pump 17, then enters the output coupler 19 which extracts the signal from the fast cyclotron wave and which functions in a manner substantially the same as that of the input coupler 14. The fast cyclotron wave energy is coupled through the output coupler 19 to the output line 20 or to the feedback control circuit 16.

Figure 2:
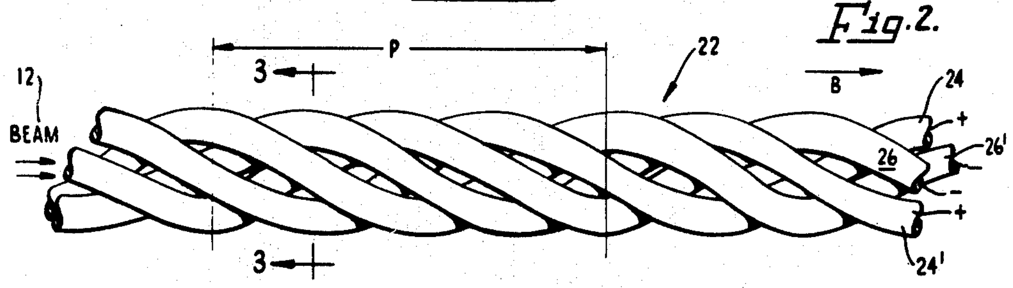
FIG. 2 is an elevational view of one embodiment of the direct-current energized pump which is an element of the combination of the present invention.

Referring to FIG. 2, an example of a direct-current energized pump in accordance with the present invention is shown. A length of a quadrifilar helix 22 is disposed symmetrically about electron stream 12. The four separate and insulated helical conductors are designated by the reference numerals 24, 24' and 26, 26'. The helical conductors 24 and 24' are at the same direct current potential and are maintained positive with respect to the direct current potential at which the helical conductors 26 and 26' are maintained. Thus, in any transverse plane along the axis of the quadrifilar helix 22 the direct current potential field within the helix is substantially quadrupole. The pitch P of the helix 22 is designed to be equal to $u_o/f_c$ where $u_o$ is the stream drift velocity and $f_c$ is the cyclotron frequency so that a spatial synchronism exists between the spiraling beam and the quadrifilar helix. For precise synchronism along the entire length of the helical pump its pitch may be slightly tapered or varied to allow for the slight decrease in $u_o$ due to the translation of longitudinal electron velocity to orbital velocity without change in the total electron energy. The radius of orbiting of the spiraling electrons may thereby be increased as they move through the quadrifilar helix by virtue of their continually experiencing a net radial acceleration due to the quadropole field which in a sense appears stationary to the helically drifting electrons. Thus, the quadrifilar helix 22 is a purely static parametric pump in which an electron entering the pump in the plane of the positive electrodes will experience a continuous deflecting acceleration and it will emerge from the pump at a larger radius than that at which it entered. An electron entering in the plane of the negative electrodes will tend to oscillate about the axis but, because of the magnetic field, may be phase focused toward the positive set of electrodes. The radio-frequency power corresponding to the amplification may be considered, in the kinematic explanation, as coming from the deceleration of the electrons in the axial direction.

Figure 3:
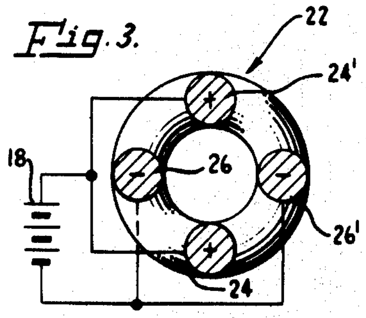
FIG. 3 is a cross-sectional view taken as indicated by line 3—3 in FIG. 2.

FIG. 3 is a cross-sectional view of the quadrifiler helix 22 of FIG. 2. The helical conductors 24, 24' and 26, 26' may be seen as being symmetrically disposed about their common axis. The helical conductors 24, 24' are connected to the positive terminal of a voltage source 18 and the helical conductors 26, 26' are connected to the negative terminal of the source 18. Such an arrangement of quadrupole electrodes and their potentials gives rise to a substantially hyperbolic potential field distribution with in the region bounded by the electrodes. The resulting field is not shown in the figure for the sake of simplicity. Its general nature or exact configuration may be plotted by one skilled in the art. A hyperbolic field is not essential if the system is being utilized as an oscillator; however, the device becomes particularly useful as an amplifier if a substantially hyperbolic field is provided. This is because if the device is being utilized as an amplifier it is desirable to have the overall magnitude of gain be independent of the level of the input signal. That is, it is desired that the amplification not be dependent on the initial radius of orbiting of the entrant electrons. This is provided with the parametric pump of the present invention because, by definition, the potential in a hyperbolic field is proportional to the square of the radius; and the gain or amplification is proportional to the second derivative of the potential taken with respect to radius. Therefore, the potential being proportional to the square of the radius, its second derivative with respect thereto is a constant and the gain with respect to radius is constant as is desired.

Figure 4:
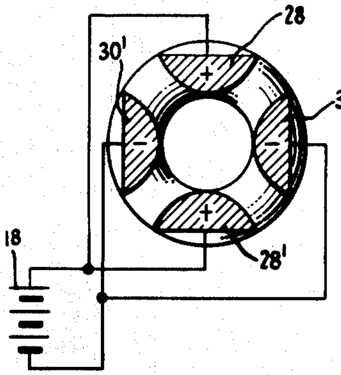
FIG. 4 and FIG. 5 are cross-sectional views of alternative embodiments of the direct-current energized pump.

Referring to FIG. 4, a cross-sectional view of an alternative embodiment of the quadrifilar helix 22 is illustrated. The cross-section of the conductors 28 and 28' and 30, 30' is noncircular for the purpose of providing more accurately the desired hyperbolic field. The inner cylindrical-like surfaces of these conductors may in fact be hyperbolic in cross-section. Again, one pair of the conductors, viz., 28, 28' is connected to the positive terminal of a voltage source 18, while the other pair 30, 30' is connected to the negative terminal of the source 18.

Figure 5:
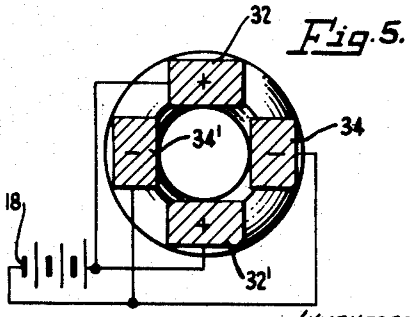

In FIG. 5 still a further configuration is depicted in which the helical conductors 32, 32', 34 and 34' are rectangular in cross-section. This geometry is in some cases easier to manufacture.

Figure 6:
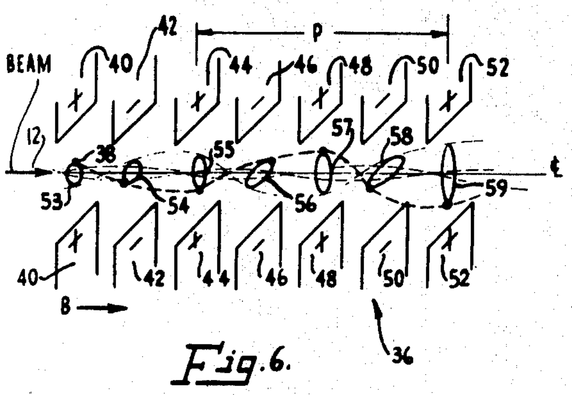
FIG. 6 is a schematic view of still another alternative embodiment of the direct-current energized pump.

Referring to FIG. 6, there is illustrated an additional embodiment of a direct-current energized parametric pump. An array 36 of transversely disposed conductive plates is disposed along opposite sides of the electron stream 12. The array comprises alternately arranged, positively charged plates and negatively charged plates, these potentials being with respect to that of the electron stream 12. The longitudinal spacing of the plates in the array 36 is $P/4$ where P as above is $u_o/f_c$.

The operation of the array 36 and the reason for the use of the term P in connection therewith as indicating a period of spiral rotation may be best understood from considering the trajectory of a electron 38 which enters the array above the axis or center of the beam 12 in the figure. The electron will be spiraling with a right-hand sense of rotation due to the presence of the magnetic field B in the direction shown. Thus as the electron progresses from the plane of the positive plates 40 to that of the negative plates 42 the electron will travel away from the negative plates 42 toward the horizontal central plane containing the axis of the beam 12. It can be seen that the negative potential on the plates will aid in this motion by repelling the electron 38 away from them toward the central horizontal plane. As the electron 38 continues to spiral it approaches the positive plates 44 and its excursion from said horizontal plane is aided by the positive potential of the lower of the plates 44. The negative plates 46, as with negative plates 42, help to push the electron 38 back toward the central horizontal plane and positive plates 48 again aid in increasing the electron's excursion above the central horizontal plane. The process is continued past the negative plates 50 and the positive plates 52.

Thus, again, as discussed above in connection with the structure of FIG. 2, an electron 38, for example, entering the pump in the vertical central plane above the central horizontal plane will experience a continuous deflecting action as it spirals about the axis of the beam and will emerge from the pump at a larger radius of cyclotron spiraling than that at which it entered.

Also, again, an electron entering off-axis but in the horizontal central plane will tend to oscillate about the axis as it spirals along the tube but because of the magnetic field and the alternating polarity of the plates 40–52, it may be phase focused toward the positive plates and away from the negative plates and may ultimately achieve approximately the phase of the electrons, such as electron 38, which entered in the proper phase of spiraling to experience maximum amplification The closed lines or loops 53, 54, 55, 56, 57, 58 and 59 represent the intersection of the spiraling beam with planes perpendicular to the axis of the beam and specifically, with planes which contain the conductive plates 40–52. The geometry of the spiraling beam is considered to be better described in this manner and in addition it may be seen that the cross-section of the beam is gradually changed from circular at the input to the pump to highly elliptical at the output as a result of the phase focusing described above. Again, the radio-frequency power associated with the amplification may be considered as being obtained from the axial deceleration of the electrons.

Figure 7:
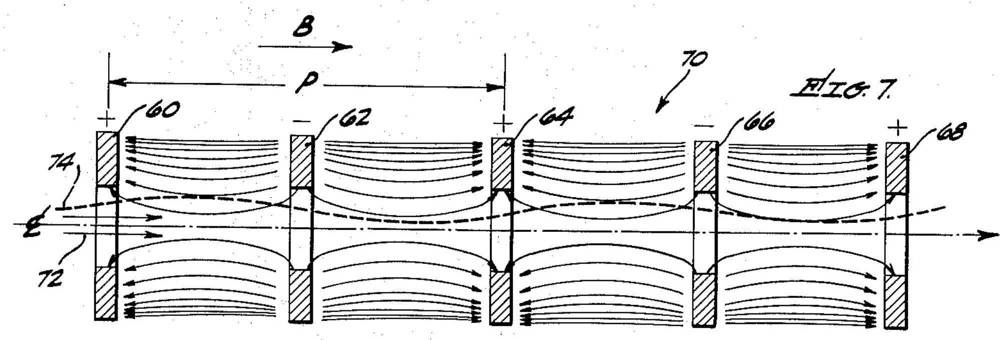
FIG. 7 and FIG. 8 are schematic diagrams useful in describing other forms of the embodiment of FIG. 6.

FIG. 7 illustrates a more specific example of the embodiment of FIG. 6. Here, the transverse conductive plates are annular discs 60, 62, 64, 66, 68 arranged in an array 70 along the charged particle stream 72. The axial magnetic field B is, as before, maintained parallel to the stream so that it may support cyclotron waves associated with the charged particles of the stream. The fast cyclotron wave experiences a net gain when the spacing of the annular discs is one-half the pitch of the spiralling beam, instead of one-fourth as in the example of FIG. 6. In other words, the spacing of the transverse plates in the array 70 is $u_o/2f_c$ where $u_o$ is the axial velocity of the charged particles and $f_c$ is their cyclotron frequency in the environment of the magnetic field B. Thus, an electron in the spiralling beam spirals about its average path once each time it traverses twice the distance of the spacing between two adjacent discs. As in the structure of FIG. 6, the transverse plates are maintained at direct-current voltages which are alternately above and below that of the stream.

Figure 8A:
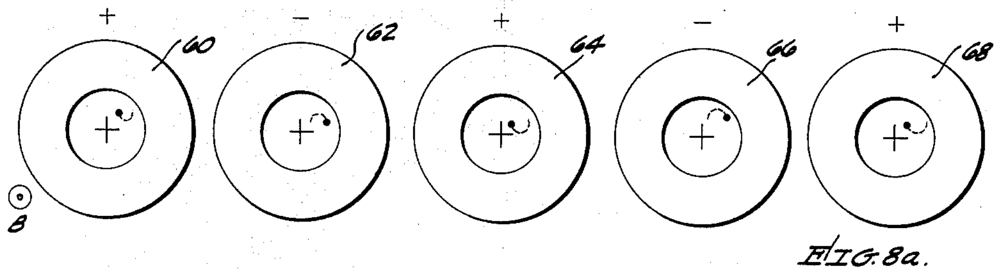

That an electron 74 may be "pumped" to a larger radius regarding the rotation of spiralling of the electron at the signal frequency as it traverses the array 70 may be seen from FIG. 8A. The disc figures of FIG. 8A correspond to and represent in plan view respective ones of the discs 60–68 of FIG. 7. The electron 74 passes through the aperture of disc 60 to the right of and above the center line ℄. At this position the electron experiences a radial force toward the closest portion of the disc. The radial component at disc 60 of the electric field between disc 60 and disc 62 is illustrated by the field distribution pattern shown in FIG. 7. Similarly, a radial field of opposite sense is shown at disc 62. Thus, the electron 74, when it reaches disc 62 in its cyclotron spiral path along the array 70, experiences a radially inward force. At disc 64, the electron is again pulled radially outward by forces like those at disc 60. These radial forces are in synchronism with the spiralling electron and therefore "pump" the spiral orbit to a greater and greater radius as additional discs of the array are passed. This mechanism causes amplification of the fast cyclotron wave and the negative energy carrying synchronous wave. In other words, an energy exchange is achieved, for example, from a synchronous wave to the fast cyclotron wave.

In order for the negative energy carrying synchronous wave to be so amplified, the stream must be decelerated as it traverses the array 70. This deceleration mechanism may be seen by observing the dotted line path of electron 74 and its relationship with the electric field patterns in FIG. 7. As the electron passes between discs 60, 62 it is decelerated; while between discs 62, 64 it is accelerated. However, a net deceleration occurs because while passing through a deceleration portion of its path, for example, between discs 60, 62, the electron is radially further from the centerline of the system than it is when passing through an acceleration portion. As indicated in FIG. 7, the axial electric field strength is less near the axis because the field force lines tend to be concentrated in the region directly between the conductive portions of the discs.

Figure 8B:
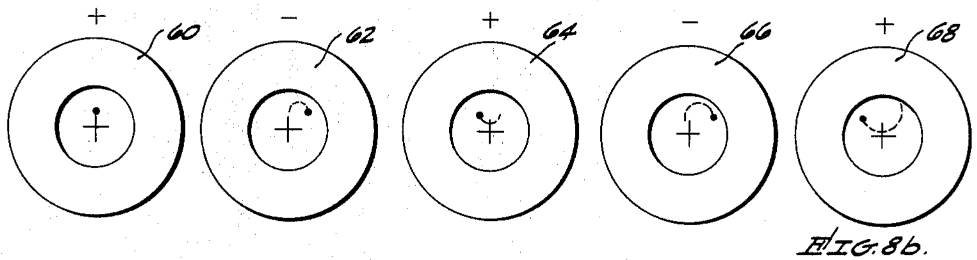
Figure 8C:
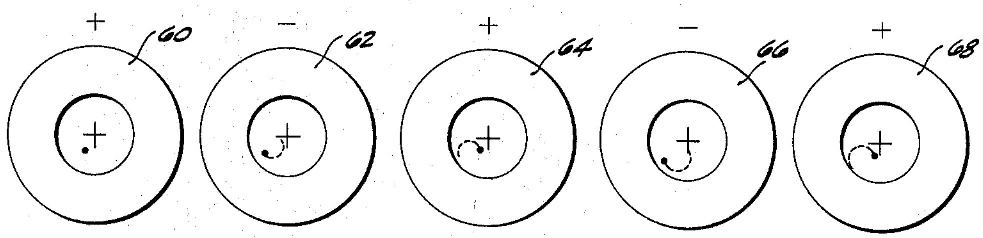

FIG. 8B and FIG. 8C illustrate that because of the angular symmetry of the disc system along the axis ℄, it is immaterial in which angular portion of the electron stream the electron is when it passes through the central opening in disc 60; the electron will be affected in the same manner as described above.

There has thus been described a new beam-type parametric amplifier which utilizes and amplifies the fast cyclotron wave by its interaction with the slow cyclotron wave. The amplifier may operate at high power levels and high frequencies because there is no requirement in the present invention for higher power radio-frequency pump energy at a frequency higher than the signal frequency. The parametric cyclotron pump of the present invention is direct current energized. In addition, the structure described is relatively simple to design and construct. It is also to be noted that the pump structures utilized in the present invention are not frequency sensitive and in fact may be readily used at extremely high frequencies.

What is claimed is:

1. A fast cyclotron wave, beam-type, parametric amplifier device comprising: gun means for projecting a stream of electrons along a predetermined axial path; magnet means for providing a magnetic field for focusing said stream along said path; electron coupler means disposed about said stream for coupling thereto electromagnetic signals to be amplified and which excite the fast cyclotron wave associated with the cyclotron orbiting of said stream electrons in the environment of said magnetic field; and direct-current energized pump means for increasing the average radius of said cyclotron orbiting, said pump means including a plurality of axially spaced arrays of conductive plates disposed along said axial path contiguously to said electron stream, each of said arrays consisting of two coplanar plates disposed on opposite sides of said electron stream in a plane perpendicular to said electron stream, the two plates in each array being maintained at the same direct current electrical potential as one another but at a different direct current electrical potential from the plates in the axially adjacent arrays, said array of plates being axially spaced such that as the modulated stream is projected along said path the average radius of orbiting is increased due to interaction between said electrons and electrostatic fields developed by said plates.

2. A cyclotron wave, beam-type, parametric amplifier device comprising: gun means for projecting a stream of electrons along a predetermined axial path; magnet means for providing a focusing magnetic field along said stream parallel to its axial path; input electron coupler means disposed about said stream for coupling thereto radio frequency signals to be amplified which excite a cyclotron wave associated with the cyclotron orbiting of said electrons in the environment of said magnetic field; and direct current energized pump means for increasing the average radius of said cyclotron orbiting, said pump means including a plurality of axially spaced arrays of conductive plates disposed along said axial path contiguously to said electron stream, each of said arrays consisting of two coplanar plates disposed on opposite sides of said electron stream in a plane perpendicular to said electron stream, the two plates in each array being maintained at the same direct current electrical potential as one another but at a different direct current electrical potential from the plates in the axially adjacent arrays, the direct current electrical potentials of axially adjacent ones of said arrays being oppositely polarized with respect to the effective voltage of said electrons, the axial spacing between successive arrays of plates being equal to $u_o/4f_c$, thus producing an electrostatic field which is axially distributed in a manner to be spatially synchronized with the cyclotron rotation of the electrons about said axial path at the frequency $f_c$ and having an axial drift velocity of $u_o$.

3. A cyclotron wave, beam-type, parametric amplifier device comprising: gun means for projecting a stream of electrons along a predetermined axial path; magnet means for providing a focusing magnetic field along said stream parallel to its axial path; input electron coupler means disposed about said stream for coupling thereto radio frequency signals to be amplified which excite a cyclotron wave associated with the cyclotron orbiting of said electrons in the environment of said magnetic field; and direct current energized pump means for increasing the average radius of said cyclotron orbiting, said pump means including a plurality of apertured conductive plates disposed along said axial path contiguously about said electron stream and in planes perpendicular to said axial path, adjacent ones of said plates being maintained at oppositely polarized direct current potentials, said potentials being respectively positive and negative with respect to the effective voltage of said electrons, the axial spacing of said plates being equal to $u_o/2f_c$, thus producing an electrostatic field which is axially distributed in a manner to be spatially synchronized with the cyclotron rotation of the electrons about said axial path at the frequency $f_c$ and having an axial drift velocity of $u_o$.

4. A fast cyclotron wave, beam-type, parametric amplifier device comprising: a source for projecting a stream of electrons along a predetermined axial path; magnet means for providing a focusing magnetic field for constraining said electrons to spiral along said path with a cyclotron orbiting component of motion thereabout; electron coupler means disposed about said stream for coupling to and thereby modulating the fast cyclotron wave associated with said stream in said magnetic field with radio frequency signals to be amplified; and direct current energized cyclotron pump means for increasing the average radius of orbiting of said electrons, said pump means including a system of axially spaced, oppositely polarized annular conductive plates disposed substantially concentrically and contiguously about said electron stream in planes perpendicular thereto, said annular plates being axially spaced along said stream so that the transverse electrostatic fields associated with said plates are distributed therealong in a manner so as to be spatially synchronous with the spiraling of said electron stream.

5. A fast cyclotron wave, beam-type, parametric amplifier device comprising: a source for projecting a stream of electrons along a predetermined axial path; magnet means for providing a focusing magnetic field for constraining said electrons to spiral along said path with a cyclotron orbiting component of motion thereabout; electron coupler means disposed about said stream for coupling to and thereby modulating the fast cyclotron wave associated with said stream in said magnetic field with radio frequency signals to be amplified; and direct current energized cyclotron pump means for increasing the average radius of orbiting of said electrons, said pump means including a system of axially spaced, oppositely polarized annular conductive plates disposed substantially concentrically and contiguously about said electron stream in planes perpendicular thereto, said annular plates having an axial spacing equal to $u_o/2f_c$, thus producing an electrostatic field which is axially distributed in a manner to be spatially synchronized with the cyclotron rotation of the electrons about said axial path at the frequency $f_c$ and having an axial drift velocity of $u_o$.

References Cited by the Examiner

UNITED STATES PATENTS

| | | | |
|---|---|---|---|
| 2,834,908 | 5/1958 | Kompfner | 315—3.6 |
| 2,844,753 | 7/1958 | Quate | 315—3.5 |
| 2,959,740 | 11/1960 | Adler | 330—5 |

OTHER REFERENCES

Gordon: "Proceedings of the IRE," June 1960, page 1158.

ROY LAKE, *Primary Examiner.*

BENNET G. MILLER, ELI J. SAX, *Examiners.*